(12) United States Patent
Camp et al.

(10) Patent No.: US 10,157,282 B2
(45) Date of Patent: Dec. 18, 2018

(54) MULTIBAND ENCRYPTION ENGINE AND A SELF TESTING METHOD THEREOF

(71) Applicant: International Business Machines Corporation, Armonk, NY (US)

(72) Inventors: Charles J. Camp, Sugar Land, TX (US); Bryan B. Grandy, Houston, TX (US); Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 14/108,197

(22) Filed: Dec. 16, 2013

(65) Prior Publication Data

US 2015/0169902 A1 Jun. 18, 2015

(51) Int. Cl.
*G06F 11/30* (2006.01)
*G06F 21/60* (2013.01)
*H04L 9/06* (2006.01)

(52) U.S. Cl.
CPC .......... *G06F 21/602* (2013.01); *H04L 9/0631* (2013.01); *H04L 2209/125* (2013.01); *H04L 2209/26* (2013.01)

(58) Field of Classification Search
CPC . H04L 9/065; H04L 9/0631; H04L 2209/125; H04L 2209/26; G06F 21/602
USPC ......................................................... 713/193
See application file for complete search history.

(56) References Cited

U.S. PATENT DOCUMENTS

| | | | |
|---|---|---|---|
| 5,561,767 A | 10/1996 | Eisenberg et al. | |
| 5,608,798 A | 3/1997 | Likens et al. | |
| 5,631,960 A * | 5/1997 | Likens | H04L 9/0637 380/2 |
| 5,757,913 A | 5/1998 | Bellare et al. | |
| 6,760,439 B1 | 7/2004 | Windirsch | |
| 6,990,395 B2 | 1/2006 | Ransom et al. | |
| 7,620,821 B1 * | 11/2009 | Grohoski | G06F 9/3851 380/1 |

(Continued)

FOREIGN PATENT DOCUMENTS

| CN | 101444096 A | 5/2009 |
|---|---|---|
| CN | 103312496 A | 9/2013 |

OTHER PUBLICATIONS

Schaffer et al., "A Flip-Chip Implementation of the Data Encryption Standard (DES)," 1997 IEEE, pp. 13-17.

(Continued)

*Primary Examiner* — Samson B Lemma
(74) *Attorney, Agent, or Firm* — Zilka-Kotab, P.C.

(57) ABSTRACT

In one embodiment, a system includes a processor and logic integrated with and/or executable by the processor, the logic being configured to cause the processor to receive a data stream including data for encryption, insert one or more test vectors between individual blocks of data of the data stream, encrypt the blocks of data including the one or more test vectors to produce an encrypted data stream including one or more encrypted test vectors, decrypt the encrypted data stream including the one or more encrypted test vectors, compare each decrypted test vector with a corresponding inserted test vector, and report results of the comparison. Other systems, methods, and computer program products for self testing an encryption/decryption cycle are described according to more embodiments.

19 Claims, 4 Drawing Sheets

(56) References Cited

U.S. PATENT DOCUMENTS

| | | | |
|---|---|---|---|
| 7,752,592 | B2 | 7/2010 | Butter |
| 7,788,479 | B2 | 8/2010 | Ishii |
| 7,797,536 | B1 | 9/2010 | Lyle |
| 8,218,765 | B2 | 7/2012 | Proudler et al. |
| 8,266,450 | B2 | 9/2012 | Endo et al. |
| 2002/0048364 | A1* | 4/2002 | Gligor .................. H04L 9/0637 380/37 |
| 2005/0271201 | A1* | 12/2005 | Shimizu ................ H04L 9/0625 380/28 |
| 2006/0198515 | A1 | 9/2006 | Forehand et al. |
| 2008/0130890 | A1 | 6/2008 | Rigler |
| 2009/0147947 | A1 | 6/2009 | Ingimundarson et al. |
| 2012/0237035 | A1* | 9/2012 | Kawabata ............. H04L 9/0631 380/277 |

OTHER PUBLICATIONS

Nagaraj et al., "An FPGA Based Performance Analysis of Pipelining and Unrolling of AES Algorithm," 2006 IEEE, pp. 477-482.

IBM, "Extensible Component-based System for Piecewise Encryption of XML Streaming Data," IPCOM000146509D, Feb. 14, 2007, pp. 1-3.

Internet Society et al., "Using Advanced Encryption Standard (AES) Counter Mode With IPsec Encapsulating Security Payload (ESP)," IPCOM000021656D, Jan. 1, 2004, pp. 1-19.

Office Action from Chinese Patent Application No. 201410679794.9, dated Jun. 16, 2017.

\* cited by examiner

MULTIBAND ENCRYPTION ENGINE AND A SELF TESTING METHOD THEREOF

BACKGROUND

The present invention relates to data storage systems, and more particularly, this invention relates to a multiband encryption engine and a self testing method thereof.

In data storage, it is crucial that data is retrievable from media on which it is stored with only a limited number of correctable errors therein. In order to store data to media and read the data from the media, the following steps are taken when it is desired to store encrypted data to the media.

First, an encryption procedure is performed on the data to be stored, then the data is stored to the media, and then, possibly at some later time, a decryption procedure is used to read the stored data from the media. Some encryption procedures adhere to one or more specific standards, such as the Advanced Encryption Standard (AES), may be based on a tweakable block cipher (e.g., XTS), a symmetric block cipher (e.g., AES-128), etc. Errors may be introduced into the data during the encryption procedure, the storage procedure, or the reading procedure. In order to check whether data is corrupted as it is being stored, encryption self testing has been used. However, conventional encryption self testing is resource intensive and causes unwanted delays and latency to storage operations.

These delays and latency are undesirable, particularly in resource constrained performance driven application specific integrated circuits (ASICs), field programmable gate arrays (FPGAs), etc. In order to overcome these delays and latencies, multiple encryption and decryption hardware engines may be used, or the encryption/decryption process may be handled in one or more software layers, as opposed to strictly hardware implementations. A first drawback to either of these solutions is complexity. Another drawback is that the encryption/decryption engine would not achieve full bandwidth due to resource sharing.

BRIEF SUMMARY

In one embodiment, a system includes a processor and logic integrated with and/or executable by the processor, the logic being configured to cause the processor to receive a data stream including data for encryption, insert one or more test vectors between individual blocks of data of the data stream, encrypt the blocks of data including the one or more test vectors to produce an encrypted data stream including one or more encrypted test vectors, decrypt the encrypted data stream including the one or more encrypted test vectors, compare each decrypted test vector with a corresponding inserted test vector, and report results of the comparison.

In another embodiment, a method for self testing an encryption/decryption cycle includes receiving a data stream including data for encryption, inserting one or more test vectors between individual blocks of data of the data stream, encrypting the blocks of data including the one or more test vectors to produce an encrypted data stream including one or more encrypted test vectors, decrypting the encrypted data stream including the one or more encrypted test vectors, comparing each decrypted test vector with a corresponding inserted test vector, and reporting results of the comparison.

In yet another embodiment, a computer program product for self testing an encryption/decryption cycle includes a computer readable storage medium having program code embodied therewith, the program code readable/executable by a processor to receive a data stream including data for encryption, insert one or more test vectors between individual blocks of data of the data stream, encrypt the blocks of data including the one or more test vectors to produce an encrypted data stream including one or more encrypted test vectors, decrypt the encrypted data stream including the one or more encrypted test vectors, compare each decrypted test vector with a corresponding inserted test vector, and report results of the comparison.

Any of these embodiments may be implemented in a magnetic data storage system such as a tape drive system or hard disk drive system, which may include a magnetic head, a drive mechanism for passing a magnetic medium (e.g., a recording tape or hard disk) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
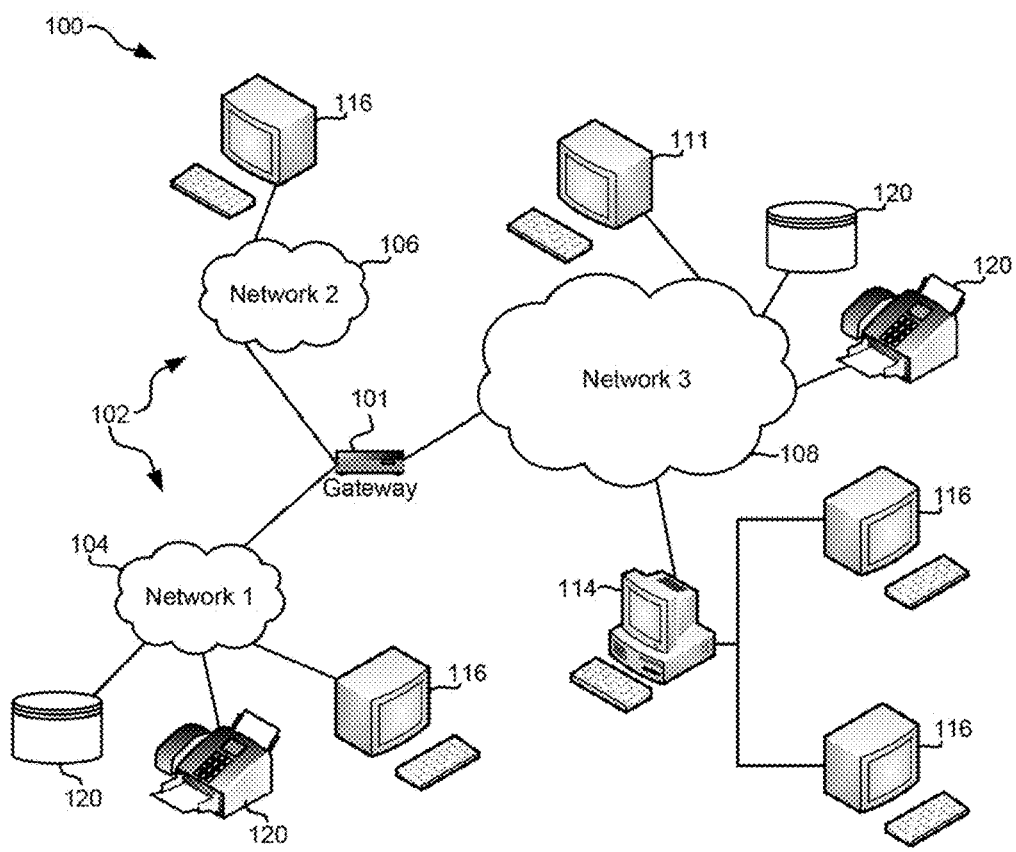
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof.

The problems associated with self testing an encryption/decryption process for storage of data to media may be solved by increasing clock rates in a pipeline architecture disclosed herein according to one embodiment.

In one general embodiment, a system includes a processor and logic integrated with and/or executable by the processor, the logic being configured to cause the processor to receive a data stream including data for encryption, insert one or more test vectors between individual blocks of data of the data stream, encrypt the blocks of data including the one or more test vectors to produce an encrypted data stream including one or more encrypted test vectors, decrypt the encrypted data stream including the one or more encrypted test vectors, compare each decrypted test vector with a corresponding inserted test vector, and report results of the comparison.

In another general embodiment, a method for self testing an encryption/decryption cycle includes receiving a data stream including data for encryption, inserting one or more test vectors between individual blocks of data of the data stream, encrypting the blocks of data including the one or more test vectors to produce an encrypted data stream including one or more encrypted test vectors, decrypting the encrypted data stream including the one or more encrypted test vectors, comparing each decrypted test vector with a corresponding inserted test vector, and reporting results of the comparison.

In yet another general embodiment, a computer program product for self testing an encryption/decryption cycle includes a computer readable storage medium having program code embodied therewith, the program code readable/executable by a processor to receive a data stream including data for encryption, insert one or more test vectors between individual blocks of data of the data stream, encrypt the blocks of data including the one or more test vectors to produce an encrypted data stream including one or more encrypted test vectors, decrypt the encrypted data stream including the one or more encrypted test vectors, compare each decrypted test vector with a corresponding inserted test vector, and report results of the comparison.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
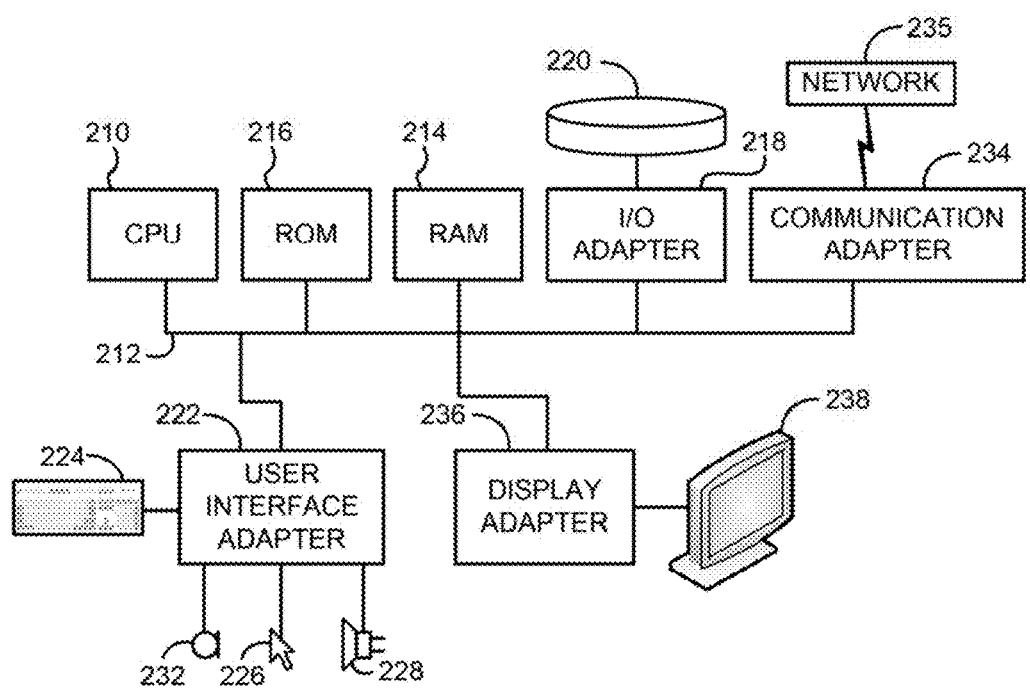
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other nits interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
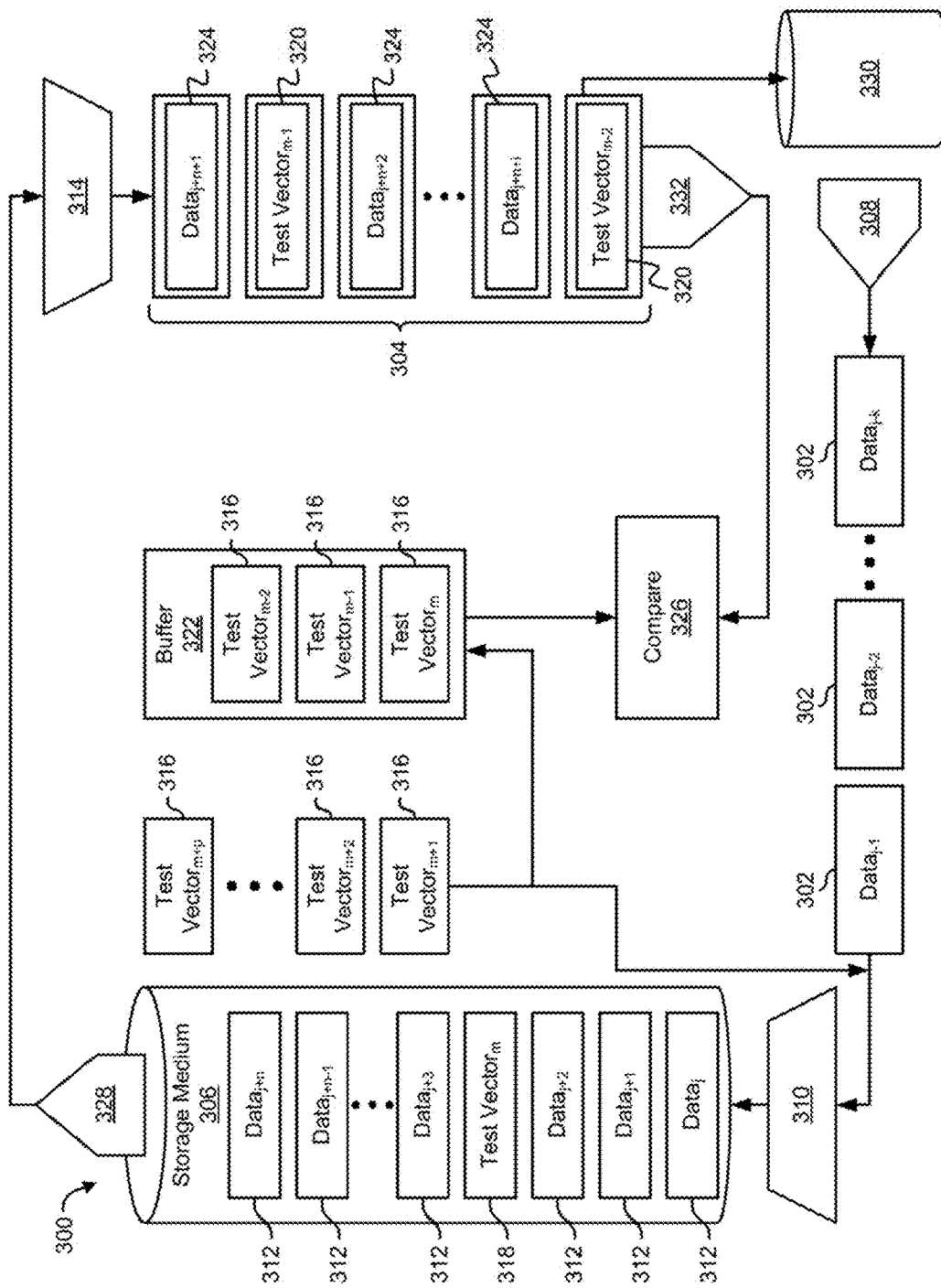
FIG. 3 is a block diagram of a system, according to one embodiment.

Now referring to FIG. 3, a system 300 is shown according to one embodiment. As an option, the present system 300 may be implemented in conjunction with features from any other embodiment listed herein, such as those described with reference to the other Figures. Of course, however, such system 300 and others presented herein may be used in various applications and/or in permutations which may or may not be specifically described in the illustrative embodiments listed herein. Further, the system 300 presented herein may be used in any desired environment.

The system 300 is configured to store data to one or more storage media 304 and/or a storage medium 306 in blocks 302 of data from a stream 308 of data. The one or more storage media 304 and/or the storage medium 306 may be any type of storage media known in the art, such as RAM, EEPROM, Flash memory and other types of nonvolatile RAM (NVRAM), hard disk, optical disk, magnetic tape, etc. Additionally, the one or more storage media 304 and/or the storage medium 306 may be separated into buffers, partitioned, or in some other way divided for storing individual blocks 302 of data separate from one another.

The system 300 is configured to receive the stream 308 from some external device, system, application, etc., and produce the blocks 302 of data from the stream 308. In one embodiment, the stream 308 of data is sent to the system 300 to prepare the data to be stored to a final storage medium 330, such as a hard disk, magnetic tape, optical disk, etc., and the one or more storage media 304 and/or the storage medium 306 is used as a temporary buffer while the data is prepared to be stored to the final storage medium 330.

Once received by the system 300, the stream 308 of data, which may be read from the final storage medium 330 or some other desired data source, is split into blocks 302 of data and stored in the one or more storage media 304 and/or the storage medium 306. The blocks 302 of data are sized such that one block 302 fits into one portion of the one or more storage media 304 and/or the storage medium 306, as described previously, according to one embodiment. In other embodiments, more or less than one block 302 of data may fit into each portion of the one or more storage media 304 and/or the storage medium 306, such as 2 blocks 302, 4 blocks 302, 8 blocks 302, etc.

Each block 302 of data is then encrypted using an encryption module or engine 310 to produce encrypted blocks 312 of data. This encryption module 310 is a multiband independent pipeline encryption module and is configured to operate a plurality of independent pipeline encryption operations, such that each block 302 of data may be encrypted and/or decrypted independent of any other block 302 of data. These encrypted blocks 312 of data may be written to the one or more storage media 304 temporarily prior to being stored to the storage medium 306, written to the storage medium 306 prior to being written to the one or more storage media 304, stored in either of the one or more storage media 304 and/or the storage medium 306, etc. For variety of description, the encrypted blocks 312 of data are shown stored to the storage medium 306, while decrypted blocks 324 of data are shown stored to the one or more storage media 304. Of course, any particular arrangement may be used, as would be understood by one of skill in the art, and is not limited to the arrangement shown in FIG. 3.

In one other embodiment, there is only one storage medium 306, and the one or more storage media 304 may actually be portions of the storage medium 306, such that the encrypted blocks 312 of data (and possibly some encrypted test vectors 318) are stored to the same storage medium 306 as the decrypted blocks 324 of data (and possibly decrypted text vectors 320). In another alternate embodiment, the final storage medium 330 may comprise the storage medium 306 and/or the one or more storage media 304, thereby using only one storage medium 330 for storage of data and test vectors during each stage in the encryption/decryption cycle.

The decryption module or engine 314 is configured to receive a stream 328 of encrypted data which includes the encrypted blocks 312 of data (and possibly some encrypted test vectors 318) according to one embodiment. The decryption module or engine 314 is configured to provide decrypted blocks 324 of data (and possibly some decrypted text vectors 320) from this stream 328 of encrypted data according to another embodiment.

Efficient multistage pipeline encryption and decryption with independent pipeline stages, as shown in FIG. 3, allows for streamed multiband encryption enabling XTS and/or multiband AES-type encryption schemes (among others) and near line data transfer speeds with less than about 10 μs of latency overhead added to the encryption/decryption cycle. Each pipeline stage operates independently in both the encryption module 310 and the decryption module 314, with each stage representing a single round in the encryption process.

At each stage, sufficient control data is passed along with the encrypting information to identify which key should be used for the current data block and this information is then passed along to the next stage after the round operation is performed. By breaking each round into a pipeline stage, dependencies from one plaintext/ciphertext set to the next are isolated, which allows for context switches at the pipeline stage granularity. Application specific control may be used to ensure proper priority of certain types of operations, thereby ensuring consistent data flow with prioritization of certain directions of data flow and minimal latency impact overall.

For example, in one embodiment, read and/or write commands for user data may have priority over encryption/decryption operations. In an alternate and preferred embodiment, encryption/decryption operations may have priority over read and/or write commands for user data.

In order to determine whether the encryption and/or writing process has been corrupted in any way or whether the data is corrupted after encryption, a self-test may be performed on the encrypted blocks 312 of data, after being written to the one or more storage media 304, and/or before or after being written to the storage medium 306, in various approaches. To test the encrypted blocks 312 of data before being stored to the one or more storage media 304, the encrypted blocks 312 of data stored in the storage medium 306 may be accessed therefrom and may be decrypted using a decryption module 314 which is configured to reverse the encryption code used to encrypt the data in the encryption module 310.

Rather than using an additional resource (such as an additional encryption module and/or decryption module) to verify correct operation of the encryption module 310, the multiband pipeline encryption module 310 is leveraged to perform periodic encryption/decryption self test checks. The small performance sacrifice of this approach allows for engine self testing to be performed that may be configured to a desired risk level (corresponding to a probability of data being corrupted) without requiring dedicated resources and an inherent increase in failure rate associated with an extra module or engine. Furthermore, it is not desirable to delay the decryption of the data for a user who is anticipating the data which would result from the cost associated with starving the decryption performance on a shared decryption module.

According to one embodiment, with each block or logical sector of data encrypted, a test vector 316 may be chosen to be encrypted and decrypted as a test to verify that both the encryption module 310 and the decryption module 314 do not have faults causing encryption to be performed with an unintended key or some other data integrity issue that will jeopardize appropriate retrieval of the data at a later time from the storage medium 306 and/or the one or more storage media 304. Each test vector may be created according to known practices in the art. After creation, each of the test vectors 316 are stored in a buffer 322 for later comparison with a decrypted test vector 320 provided in a stream 332 of decrypted data (and possibly decrypted test vectors 320) read from the storage medium 306 and/or the one or more storage media 304 after decryption thereof using the decryption module 314.

In one embodiment, the buffer 322 may operate as a first-in-first-out (FIFO) buffer, in order to ensure comparisons are made between corresponding test vectors. Of course, any other method of storing the test vectors 316 may be used as would be known to one of skill in the art. Furthermore, the comparison 326 may be made using any module, processor, routine, application, etc., as would be understood by one of skill in the art.

The test vectors 316 are encrypted using the encryption module 310 to produce encrypted test vectors 318 and then inserted between any two of the encrypted blocks 312 of data. Where the encrypted test vectors 318 are inserted may be randomly chosen, spread across a sampling of the data stream 308, inserted after a predetermined number of data blocks 312 have been stored, etc. The encrypted blocks 312 of data and the encrypted test vectors 318 then undergo decryption using the decryption module 314 to produce decrypted blocks 324 of data and decrypted test vectors 320, and the resulting decrypted test vectors 320 are compared 326 to the original test vectors 316 to determine whether the encryption/decryption cycle is operating properly. Since the test vectors and the blocks of data undergo encryption and decryption in the same cycle, the test vectors are able to provide information as to how the encryption/decryption cycle is operating, without requiring additional resources, such as encryption/decryption engines, buffers, storage, etc.

In one embodiment, a sufficiently uniform random sample vector 316 may be selected to be encrypted and decrypted as a test to verify the accuracy of the encryption/decryption cycle. This may be referred to as probabilistic testing, as it is ensured with a high confidence level that no errors will occur in the encryption/decryption cycle, but every operation is not tested, thereby providing for a less resource intensive testing routine.

In several embodiments, test vectors may be inserted between each predetermined amount of data blocks, with the predetermined amount of data blocks numbering between about 5 and about 100, such as about 16, 20, 30, 32, 33, 48, 50, 64, etc.

In an alternate embodiment, one or more of the test vectors 316 may be designed to test each stage of the encryption module 310 and/or decryption module 314, thereby ensuring proper operation of the encryption module 310 and/or decryption module 314 with 100% probability. This may be referred to as deterministic testing, as it is ensured that each bit is flipped in each stage of encryption/decryption in order to rigorously test the encryption/decryption cycle.

When the encryption module 310 is a stage independent multiband encryption module, the test cipher/plaintext (test vector 316) block size may be set to a minimum cipher block size for the encryption algorithm used, according to one approach. In other approaches, a longer test cipher/plaintext block size may be used when greater confidence in the self test check is desired, which results in a cost trade-off of reduced performance.

In XTS stage independent designs specifically, a single cipher/plaintext block (test vector 316) may be inserted with very little observed performance impact; furthermore, at substantially the same time or close thereto, tweak values may be run through the encryption module 310. This ensures that the results of the test are finished encrypting substantially near the same time as when the data is finished being encrypted and allows for timely decisions on whether or not the data should be relied upon or not. When the data is determined to be unreliable (corrupted or otherwise improperly encrypted/decrypted/stored/retrieved), the data may be discarded in one embodiment.

FIG. 3 relies on a variety of variables, e.g., i, j, k, m, n, and p. Each of these variables may be an integer that represents an extent or intermediate numbering of blocks or test vectors within the encryption/decryption cycle, according to various approaches. The actual values of the various variables may be selected based on the size of each data block 302, a number of data blocks 302 used, an amount of data in the data stream 308, a number of test vectors 316 used, etc.

Figure 4:
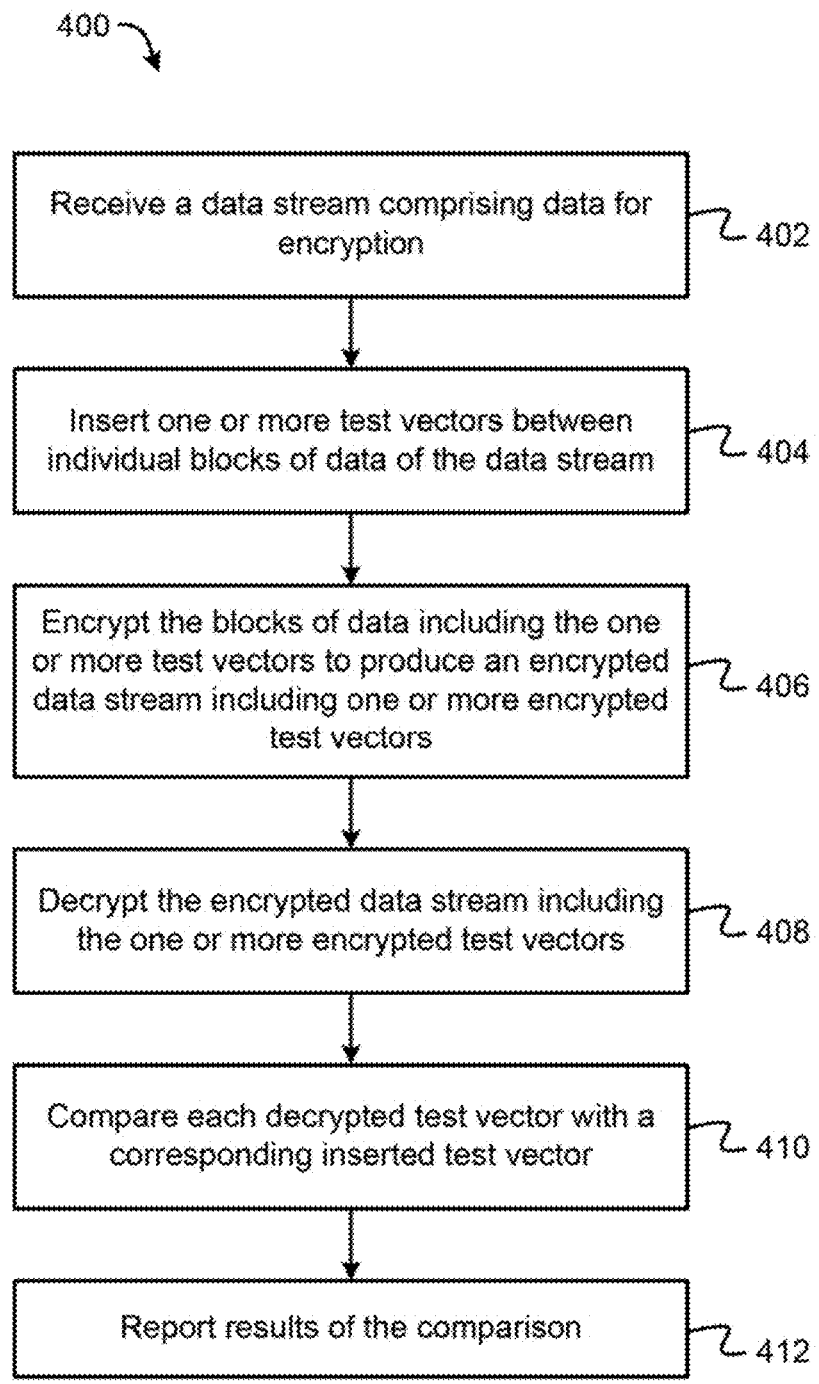
FIG. 4 is a flowchart of a method for self testing an encryption/decryption cycle, in accordance with one embodiment.

Now referring to FIG. 4, a method 400 for self testing an encryption/decryption cycle is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in one embodiment, the method 400 may be partially or entirely performed by a storage system, a storage network, a processor (such as a CPU, an ASIC, an FPGA, etc.), a server, etc., or any other suitable device or component of a system or network.

As shown in FIG. 4, method 400 may initiate with operation 402, where a data stream comprising data for encryption is received. The data stream may include a plurality of individual blocks of data, such as data sets, files, etc. When the data is received as a stream of data but is not already partitioned into individual blocks of data, the data stream is divided into blocks of data for further processing, in one approach. The blocks of data may have any desired size, and the size of the blocks may relate to a size of buffers and/or storage memory/media of a system which receives the data stream.

In operation 404, one or more test vectors are inserted between individual blocks of data of the data stream. The blocks of data may be derived from the data stream received in operation 402, may be created from the data stream, etc. Where the test vectors are inserted may be randomly chosen, evenly spread across a sampling of the data stream, inserted after a predetermined number of data blocks have been stored and/or received, etc.

In one embodiment, a sufficiently uniform random sample test vector may be selected as a test to verify the accuracy of an encryption/decryption cycle. This may be referred to as probabilistic testing, as it is ensured with a high confidence level that no errors will occur in the encryption/decryption cycle, but every operation is not tested, thereby providing for a less resource intensive testing routine.

In an alternate embodiment, one or more of the test vectors may be designed to test each stage of an encryption process and/or decryption process, thereby ensuring proper operation of the encryption/decryption cycle with 100% probability. This may be referred to as deterministic testing, as it is ensured that each bit is flipped in each stage of encryption/decryption in order to rigorously test the encryption/decryption cycle.

In order to insert the one or more test vectors, the creation of the data blocks from the data stream may be selectively paused, with each pause allowing for one test vector to be inserted between data blocks.

In another embodiment, the one or more test vectors may be chosen in order to be spread across a plurality of keys, thereby providing for a broad test of the encryption/decryption cycle.

In one approach, data encryption for one pipeline stage may be paused in order for each test vector to be inserted. In this way, in a multiband encryption engine, minimal impact on data encryption is caused by the insertion of the test vectors.

In operation 406, the blocks of data including the one or more test vectors are encrypted, according to an encryption process, to produce an encrypted data stream including one or more encrypted test vectors corresponding to the one or more inserted test vectors. The encryption may be performed using a hardware encryption engine, a software encryption routine or application, or some combination thereof. The encryption process may be any encryption process known in the art, such as a tweakable block cipher, a symmetric block cipher, etc. Specific examples of possible encryption processes include XTS, AES multiband, a combination XTS-AES, AES-128, etc.

In one embodiment, the data stream may be encrypted using a multiband pipeline encryption engine implemented in hardware, software, or a combination of hardware and software, the encryption engine being configured to encrypt the blocks of data including the one or more test vectors in independent pipeline stages with one or more different keys or schemes to produce an encrypted data stream including one or more encrypted test vectors.

In operation 408, the encrypted data stream including the one or more encrypted test vectors is decrypted, using a decryption process, to produce one or more decrypted test vectors corresponding to the one or more encrypted test vectors, along with a decrypted data stream. The decryption may be performed using a hardware decryption module, a software decryption routine or application, or some combination thereof.

In one embodiment, the encrypted data stream including the one or more encrypted test vectors may be decrypted using a multiband pipeline decryption engine implemented in hardware, software, or a combination of hardware and software, the decryption engine being configured to decrypt the encrypted data stream including the one or more encrypted test vectors using one or more corresponding keys or schemes from the encryption engine.

In one approach, data decryption for one pipeline stage may be paused in order for each test vector to be decrypted. In this way, in a multiband decryption engine, minimal impact on data decryption is caused by the decryption of the test vectors.

In operation 410, each decrypted test vector is compared with a corresponding inserted test vector. The comparison may be performed using a hardware comparison module, a software comparison routine or application, or some combination thereof.

In operation 412, results of the comparison are reported, such as publishing the results, displaying the results, storing the results, printing the results, transmitting the results, locally or remotely, etc.

In some embodiments, the results may be interpreted in order to determine, as quickly as possible, whether the encryption/decryption cycle is operating properly. The results of the comparison may include information regarding whether at least one difference exists between an inserted test vector and a decrypted test vector, which test vectors failed the comparison (did not match after undergoing the encryption/decryption cycle), which data relates to the failed test vectors (data which is located near to, subsequent to, and/or prior to the inserted test vector which failed, etc.), and/or any other useful information regarding the comparison and test vectors as would be known to one of skill in the art upon reading the present descriptions.

Method 400 may further comprise discarding any data from the data stream for which the results of the comparison indicate that at least one difference exists between an inserted test vector and a decrypted test vector. This data may be, according to various embodiments, any data in the data stream, only those data blocks near to a failed test vector, a predetermined number of data blocks surrounding a failed test vector, any data that has been encrypted/decrypted using the corresponding encryption and/or decryption engine which produced the failed test vector, etc.

In a further embodiment, the reporting the results of the comparison may include indicating that the encryption/decryption cycle is malfunctioning when the results of the comparison indicate that at least one difference exists between an inserted test vector and a decrypted test vector. In this way, the process may be corrected so that future problems are resolved with the encryption/decryption cycle prior to attempting more data encryption.

In another embodiment, method 400 may further comprise storing each of the inserted test vectors in a memory. In this way, each decrypted test vector may be compared with a corresponding test vector stored in the memory in order to determine whether one or more differences exist therebetween.

In one embodiment, a system may comprise a processor and logic integrated with and/or executable by the processor. The logic is configured to cause the processor to: receive a data stream comprising data for encryption, insert one or more test vectors between individual blocks of data of the data stream, encrypt the blocks of data including the one or more test vectors to produce an encrypted data stream including one or more encrypted test vectors, decrypt the encrypted data stream including the one or more encrypted test vectors, compare each decrypted test vector with a corresponding inserted test vector, and report results of the comparison. Any of the embodiments and/or approaches described herein may be combined with this system in any manner, as would be understood by one of skill in the art.

In another embodiment, a computer program product for self testing an encryption/decryption cycle may comprise a computer readable storage medium having program code embodied therewith. The program code is readable/executable by a processor to: receive a data stream comprising data for encryption, insert one or more test vectors between individual blocks of data of the data stream, encrypt the blocks of data including the one or more test vectors to produce an encrypted data stream including one or more encrypted test vectors, decrypt the encrypted data stream including the one or more encrypted test vectors, compare each decrypted test vector with a corresponding inserted test vector, and report results of the comparison. Any of the embodiments and/or approaches described herein may be combined with this computer program product in any manner, as would be understood by one of skill in the art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be further appreciated that embodiments of the present invention may be provided in the form of a service deployed on behalf of a customer.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a hardware processor configured to:
receive a data stream comprising data for encryption;
insert one or more test vectors between individual blocks of data of the data stream, the one or more test vectors including at least one test vector configured to test each stage of a multiband pipeline encryption engine, wherein a block size of each test vector matches a minimum cipher block size of an encryption algorithm used by the multiband pipeline encryption engine, and wherein each bit of each test vector is flipped in each stage of an encryption/decryption cycle in deterministic testing;
pause data encryption for one pipeline stage in order for each test vector to be inserted;
obtain one or more decrypted test vectors from a multiband pipeline decryption engine;
compare each of the one or more decrypted test vectors with a corresponding one of the inserted test vectors;
discard any data from the data stream for which results of the comparison indicate that at least one difference exists between the corresponding one of the inserted test vectors and one of the one or more decrypted test vectors; and
report the results of the comparison;
the multiband pipeline encryption engine implemented in hardware or a combination of hardware and software, the encryption engine being configured to encrypt the blocks of data including the one or more test vectors using the encryption algorithm in independent pipeline stages, wherein a different key is used in each independent pipeline stage to produce an encrypted data stream including one or more encrypted test vectors; and
the multiband pipeline decryption engine implemented in hardware or a combination of hardware and software, the decryption engine being configured to decrypt the encrypted data stream including the one or more encrypted test vectors to produce the one or more decrypted test vectors,
wherein less than 10 μs of latency overhead is added to the encryption/decryption cycle as a result of inserting the one or more test vectors, encrypting the blocks of data including the one or more test vectors, obtaining the one or more decrypted test vectors, and comparing each of the one or more decrypted test vectors with a corresponding one of the inserted test vectors.

2. The system as recited in claim 1, wherein the encryption algorithm utilizes a tweakable block cipher.

3. The system as recited in claim 1, wherein the multiband pipeline decryption engine is further configured to decrypt the encrypted data stream using a corresponding key from the multiband pipeline encryption engine.

4. The system as recited in claim 1, further comprising a memory, wherein the hardware processor is configured to:
store each of the one or more test vectors in the memory, wherein each of the one or more decrypted test vectors is compared with a corresponding one of the one or more test vectors stored in and retrieved from the memory, and wherein the one or more test vectors include at least one test vector configured to test each stage of the multiband pipeline decryption engine;
pause data decryption for one pipeline stage in order for each of the one or more encrypted test vectors to be decrypted;
indicate that the encryption/decryption cycle is malfunctioning when the results of the comparison indicate that at least one difference exists between the corresponding one of the inserted test vectors and one of the one or more decrypted test vectors; and
discard any data from the data stream for which the results of the comparison indicate that at least one difference exists between the corresponding one of the inserted test vectors and one of the one or more decrypted test vectors.

5. The system as recited in claim 1, further comprising a memory,
wherein the multiband pipeline decryption engine is further configured to decrypt the encrypted data stream using a corresponding key from the multiband pipeline encryption engine,
wherein the encryption algorithm utilizes a tweakable block cipher, and
wherein the hardware processor is configured to:
store each of the one or more test vectors in the memory, wherein each of the one or more decrypted test vectors is compared with a corresponding one of the one or more test vectors stored in and retrieved from the memory, and wherein the one or more test vectors include at least one test vector configured to test each stage of the multiband pipeline decryption engine;
pause data decryption for one pipeline stage in order for each of the one or more encrypted test vectors to be decrypted;
indicate that the encryption/decryption cycle is malfunctioning when the results of the comparison indicate that at least one difference exists between the corresponding one of the inserted test vectors and one of the one or more decrypted test vectors; and
discard any data from the data stream for which the results of the comparison indicate that at least one difference exists between the corresponding one of the inserted test vectors and one of the one or more decrypted test vectors.

6. The system as recited in claim 1, wherein the hardware processor is further configured to indicate that an encryption/decryption cycle is malfunctioning when the results of the comparison indicate that at least one difference exists between the corresponding one of the inserted test vectors and one of the one or more decrypted test vectors.

7. The system as recited in claim 1, further comprising a memory, wherein the hardware processor is further configured to store each of the one or more inserted test vectors in the memory, wherein each of the one or more decrypted test vectors is compared with a corresponding one of the one or more test vectors stored in and retrieved from the memory, and wherein the one or more test vectors include at least one test vector configured to test each stage of the multiband pipeline decryption engine.

8. A method for self testing an encryption/decryption cycle, the method comprising:

receiving a data stream comprising data for encryption;
inserting one or more test vectors between individual blocks of data of the data stream, the one or more test vectors including at least one test vector configured to test each stage of a multiband pipeline encryption engine, wherein a block size of each test vector matches a minimum cipher block size of an encryption algorithm used by the multiband pipeline encryption engine, and wherein each bit of each test vector is flipped in each stage of encryption and decryption in deterministic testing;
encrypting, using the multiband pipeline encryption engine implemented, at least in part, in hardware, the blocks of data including the one or more test vectors using the encryption algorithm in independent pipeline stages, wherein a different key is used in each independent pipeline stage to produce an encrypted data stream including one or more encrypted test vectors;
decrypting the encrypted data stream including the one or more encrypted test vectors to produce at least decrypted test vectors using a multiband pipeline decryption engine;
comparing each decrypted test vector with a corresponding inserted test vector;
discarding any data from the data stream for which results of the comparison indicate that at least one difference exists between an inserted test vector and a decrypted test vector; and
reporting the results of the comparison,
wherein less than 10 µs of latency overhead is added to the encryption/decryption cycle as a result of inserting the one or more test vectors, encrypting the blocks of data including the one or more test vectors, decrypting the encrypted data stream, and comparing each decrypted test vector with a corresponding inserted test vector.

9. The method as recited in claim 8, wherein the encryption algorithm utilizes a tweakable block cipher.

10. The method as recited in claim 8, wherein the decrypting the encrypted data stream including the one or more encrypted test vectors is performed using a multiband pipeline decryption engine implemented in hardware or a combination of hardware and software using one or more corresponding keys from the multiband pipeline encryption engine.

11. The method as recited in claim 8, wherein the inserting the one or more test vectors between the blocks of data further comprises pausing data encryption for one pipeline stage in order for each test vector to be inserted.

12. The method as recited in claim 8, wherein the encryption algorithm utilizes a tweakable block cipher, wherein the decrypting the encrypted data stream including the one or more encrypted test vectors is performed using a multiband pipeline decryption engine implemented in hardware or a combination of hardware and software using one or more corresponding keys from the multiband pipeline encryption engine and further comprises:
storing each of the one or more test vectors in a memory, wherein each of the decrypted test vectors is compared with a corresponding one of the one or more test vectors stored in and retrieved from the memory, wherein the one or more test vectors include at least one test vector configured to test each stage of the multiband pipeline decryption engine;
pausing data decryption for one pipeline stage in order for each test vector to be decrypted, wherein the one or more test vectors include at least one test vector configured to test each stage of the multiband pipeline decryption engine;
indicating that the encryption/decryption cycle is malfunctioning in response to the results of the comparison indicating that at least one difference exists between the corresponding one of the inserted test vectors and one of the decrypted test vectors; and
discarding any data from the data stream for which the results of the comparison indicate that at least one difference exists between the corresponding one of the inserted test vectors and one of the decrypted test vectors.

13. The method as recited in claim 8, wherein the reporting the results of the comparison includes indicating that the encryption/decryption cycle is malfunctioning when the results of the comparison indicate that at least one difference exists between an inserted test vector and a decrypted test vector.

14. The method as recited in claim 8, further comprising storing each of the inserted test vectors in a memory, wherein each decrypted test vector is compared with a corresponding test vector stored in the memory.

15. A computer program product for self testing an encryption/decryption cycle, the computer program product comprising a non-transitory computer readable storage medium having program code embodied therewith, the program code readable/executable by a processor to:
receive a data stream comprising data for encryption;
insert one or more test vectors between individual blocks of data of the data stream, the one or more test vectors including at least one test vector configured to test each stage of a multiband pipeline encryption engine and each stage of a multiband pipeline decryption engine, wherein a block size of each test vector matches a minimum cipher block size of an encryption algorithm used by the multiband pipeline encryption engine, and wherein each bit of each test vector is flipped in each stage of encryption and decryption in deterministic testing;
encrypt the blocks of data including the one or more test vectors using the multiband pipeline encryption engine using the encryption algorithm in independent pipeline stages, wherein a different key is used in each independent pipeline stage to produce an encrypted data stream including one or more encrypted test vectors;
decrypt the encrypted data stream including the one or more encrypted test vectors using the multiband pipeline decryption engine to produce at least decrypted test vectors;
compare each decrypted test vector with a corresponding inserted test vector;
discard any data from the data stream for which results of the comparison indicate that at least one difference exists between an inserted test vector and a decrypted test vector; and
report the results of the comparison,
wherein less than 10 µs of latency overhead is added to the encryption/decryption cycle as a result of inserting the one or more test vectors, encrypting the blocks of data including the one or more test vectors, decrypting the encrypted data stream, and comparing each decrypted test vector with a corresponding inserted test vector.

16. The computer program product as recited in claim 15, wherein the encryption algorithm utilizes a tweakable block cipher.

17. The computer program product as recited in claim 15, wherein the encryption algorithm utilizes a tweakable block cipher, wherein the program code configured to insert the one or more test vectors between the blocks of data is further configured to pause data encryption for one pipeline stage in order for each test vector to be inserted, wherein the program code configured to decrypt the encrypted data stream including the one or more encrypted test vectors is further configured to pause data decryption for one pipeline stage in order for each test vector to be decrypted, wherein the program code configured to report the results of the comparison is further configured to indicate that the encryption/decryption cycle is malfunctioning in response to the results of the comparison indicating that at least one difference exists between an inserted test vector and a decrypted test vector, wherein the program code is further configured to store each of the inserted test vectors in a memory, and wherein each decrypted test vector is compared with a corresponding test vector stored in the memory.

18. The computer program product as recited in claim 15, wherein the program code configured to report the results of the comparison is further configured to indicate that the encryption/decryption cycle is malfunctioning when the results of the comparison indicate that at least one difference exists between an inserted test vector and a decrypted test vector.

19. The computer program product as recited in claim 15, wherein the program code is further configured to store each of the inserted test vectors in a memory, and wherein each decrypted test vector is compared with a corresponding test vector stored in the memory.

\* \* \* \* \*